United States Patent
Yoshimoto et al.

(10) Patent No.: US 10,023,085 B2
(45) Date of Patent: Jul. 17, 2018

(54) SEAT HEATER

(71) Applicant: Panasonic Intellectual Property Management Co., Ltd., Osaka (JP)

(72) Inventors: Koji Yoshimoto, Shiga (JP); Takaaki Hyoudou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/598,772

(22) Filed: May 18, 2017

(65) Prior Publication Data

US 2017/0253156 A1    Sep. 7, 2017

Related U.S. Application Data

(63) Continuation of application No. PCT/JP2016/001506, filed on Mar. 16, 2016.

(30) Foreign Application Priority Data

Apr. 8, 2015  (JP) ................................. 2015-078875

(51) Int. Cl.
  *B60N 2/56* (2006.01)
  *A47C 7/74* (2006.01)
  *H05B 3/20* (2006.01)

(52) U.S. Cl.
  CPC ............ *B60N 2/5678* (2013.01); *A47C 7/748* (2013.01); *H05B 3/20* (2013.01); *H05B 2203/003* (2013.01)

(58) Field of Classification Search
  CPC ........ B60N 2/5678; A47C 7/748; H05B 3/20; H05B 2203/003; H05B 2203/004
  (Continued)

(56) References Cited

U.S. PATENT DOCUMENTS 4,825,048 A * 4/1989 Altmann ................ A47C 7/748
                                        219/202
2009/0095725 A1* 4/2009 Ohashi ................ B60N 2/5685
                                        219/202

(Continued)

FOREIGN PATENT DOCUMENTS

| JP | 58-052848 U | 4/1983 |
|---|---|---|
| JP | 4-345784 | 12/1992 |
| WO | 2014/017078 | 1/2014 |

OTHER PUBLICATIONS

International Search Report of PCT application No. PCT/JP2016/001506 dated Jun. 7, 2016.

*Primary Examiner* — Milton Nelson, Jr.
(74) *Attorney, Agent, or Firm* — Greenblum & Bernstein, P.L.C.

(57) ABSTRACT

A seat heater includes a seating heater, a protection device of a non-resettable type, a base material, and a protecting heater. The protection device has a first surface and a second surface opposite to the first surface. The base material is a sheet having a first covering portion covering the first surface and a second covering portion covering the second surface, and is folded so that the first covering portion and the second covering portion face each other. The protecting heater heats the protection device. The protecting heater includes a pair of first heating portions and a second heating portion. The pair of first heating portions are formed as a meandered shape only on a surface, which faces the second covering portion, of the first covering portion. The second heating portion is disposed between the pair of first heating portions, and formed as a meandered shape both on the surface, which faces the second covering portion, of the first covering portion, and on a surface, which faces the first covering portion, of the second covering portion.

11 Claims, 11 Drawing Sheets

(58) Field of Classification Search
USPC .................................................. 297/180.12
See application file for complete search history.

(56) References Cited

U.S. PATENT DOCUMENTS

| | | | |
|---|---|---|---|
| 2012/0228903 A1* | 9/2012 | Abe .................. | A47C 7/74 297/180.12 |
| 2014/0097651 A1* | 4/2014 | Fortune .............. | B60N 2/5685 297/180.12 |
| 2015/0108115 A1 | 4/2015 | Yoshimoto et al. | |

* cited by examiner

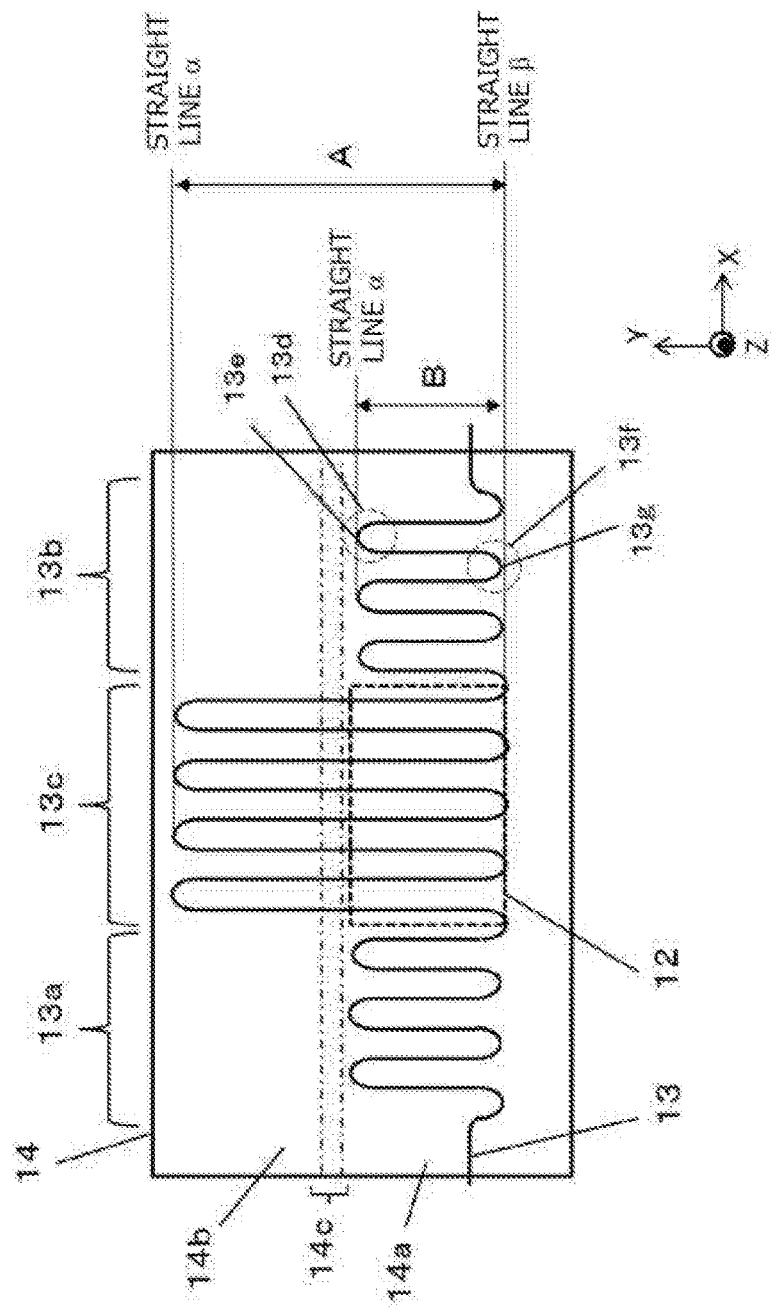

SEAT HEATER

RELATED APPLICATIONS

This application is a Continuation of International Application No. PCT/JP2016/001506, filed on Mar. 16, 2016, which in turn claims priority from Japanese Patent Application No. 2015-078875, filed on Apr. 8, 2015, the contents of all of which are incorporated herein by reference in their entireties.

TECHNICAL FIELD

The present disclosure relates to a seat heater provided to a seat of an automobile or another vehicle in order to heat the seat.

BACKGROUND

In recent years, hybrid electric vehicles and electric vehicles have been getting popular. Each of these vehicles has a less or no amount of exhaust heat from an engine compared with other automobiles. Therefore, a vehicle interior of each of these vehicles is not fully heated with only exhaust heat from the engine.

A seat heater for directly heating a seating person has now been focused on. In order to fully heat a vehicle interior of a vehicle having a smaller amount of exhaust heat from an engine, a seat heater that outputs a larger amount of heat has been demanded.

A temperature of a seat heater having a higher output rises faster than a temperature of a conventional seat heater. To heat a protection device that stops the seat heater in an event of emergency along with this rise in temperature of the seating heater, an amount of heat output from a heater for the protection device should be increased. Thus, it has been proposed that a heater for a protection device covers a pair of portions facing each other of the protection device. By covering the pair of portions, heating of the protection device is facilitated. As a result, a temperature that is higher than a temperature at which the seat heater normally operates can be set as an operating temperature of the protection device (see International Patent Publication No. 2014/017078).

SUMMARY

A seat heater according to the present disclosure is a seat heater used together with a seat. The seat heater according to the present disclosure includes a seating heater, a protection device of a non-resettable type, and a protecting heater. The seating heater is connected to a power supply in order to heat the seat. The protection device has a first surface and a second surface opposite to the first surface. When a temperature of the protection device rises to a predetermined temperature, the protection device disconnects a connection between the seating heater and the power supply. The protecting heater heats the protection device. The protecting heater includes a base material, a pair of first heating portions, and a second heating portion. The base material includes a first covering portion covering the first surface of the protection device and a second covering portion covering the second surface of the protection device. The base material, which is a sheet shape, is folded so that the first covering portion and the second covering portion face each other. The first heating portions are formed as a meandered shape on a surface, which faces the second covering portion, of the first covering portion. The second heating portion is disposed between the pair of first heating portions, and formed as a meandered shape both on the surface, which faces the second covering portion, of the first covering portion, and on a surface, which faces the first covering portion, of the second covering portion.

BRIEF DESCRIPTION OF DRAWINGS

FIG. 3 is a view illustrating an arrangement of the protecting heater on a base material used for the seat heater according to the first exemplary embodiment.

DESCRIPTION OF EMBODIMENTS

Prior to describing exemplary embodiments of the present disclosure, problems found in a conventional configuration will be described herein.

A protection device such as a thermostat is normally disposed away from a seating heater so that a seating person does not feel uncomfortable. With only a protecting heater that covers a pair of portions facing each other of the protection device, a temperature of the protection device cannot fully and promptly rise. When an output of a seat heater is to be increased, improvements are required in terms of further comfortability and safety to a seating person. A configuration for solving such problems will be described herein.

The present disclosure is not limited by first to third exemplary embodiments described below. Through all the drawings, identical or equivalent components are applied with identical numbers or symbols, and the components are described only once to avoid duplication. In some drawings, axes X, Y, and Z are added to indicate directions on the drawings. Some descriptions are given based on these three directions.

First Exemplary Embodiment

Seat heater 10 according to a first exemplary embodiment will be described herein with reference to FIGS. 1 to 4.

Figure 1:
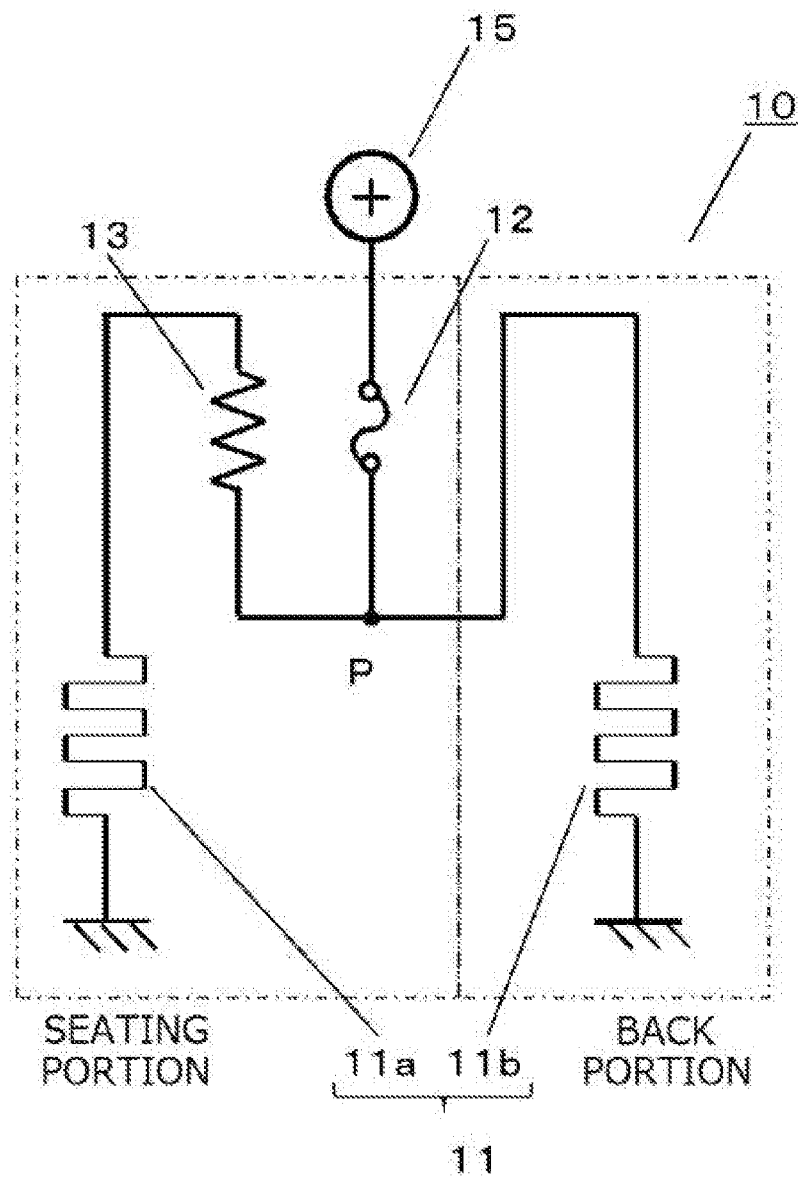
FIG. 1 is a circuit diagram illustrating a seat heater according to a first exemplary embodiment.

FIG. 1 is a circuit diagram illustrating seat heater 10. Seat heater 10 includes seating heater 11, protection device 12, and protecting heater 13. Hereinafter, seating heater 11 is referred to as heater 11, while protecting heater 13 is referred to as heater 13.

Heater 11 is disposed on a seat (not shown) of an automobile or another vehicle to heat a person seating on the seat (occupant). Heater 11 is electrically connected to power supply 15. When power is supplied from power supply 15 to heater 11, the occupant is heated. As power supply 15, for example, a power supply mounted on the automobile is used. Heater 11 includes a heat resistant, sheet base material (not shown) such as non-woven fabric and urethane, and an electric heater wire (not shown) disposed meandered at a predetermined pitch on the base material.

Heater 11 includes seating portion heater 11a disposed on a seating portion of the seat to mainly heat a buttock and thighs of the occupant, and back portion heater 11b disposed on a back portion of the seat to mainly heat a back of the occupant. Hereinafter, seating portion heater 11a is referred to as heater 11a, while back portion heater 11b is referred to as heater 11b.

Heater 11a is connected with heater 13. A series circuit of heater 11a and heater 13 is connected in parallel to a circuit including heater 11b at connecting point P. Between connecting point P and power supply 15, protection device 12 is connected. When protection device 12 is heated to a predetermined temperature by heater 13, protection device 12 disconnects an electrical connection between power supply 15 and heater 11. As protection device 12, a non-resettable thermostat, for example, is used.

Non-resettable protection device 12 is one of protection devices excluding resettable protection devices that, after an electrical connection between power supply 15 and protecting heater 13 is disconnected, electrically connect again the power supply and the protecting heater. Protection device 12 may be, for example, a thermal fuse, a manually resettable thermostat that resets when a button is operated or another action is taken, or a thermostat that does not automatically reset in a normal environment. As a possible method for resetting a thermostat that does not automatically reset as described above, for example, the thermostat is cooled to a temperature of several minus ten degrees for resetting.

Seat heater 10 is further provided with a thermostat or a controller (not shown) that uses signals of a temperature detection element such as a thermistor. The controller controls power supplied from power supply 15 to heater 11.

Figure 2A:
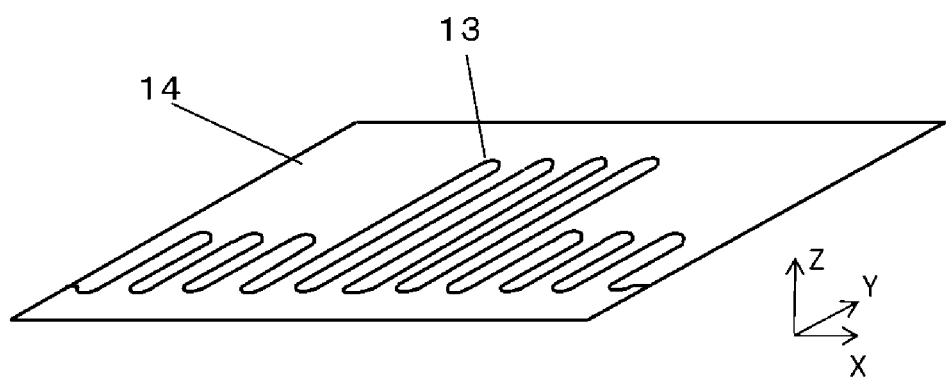
FIG. 2A is a schematic view illustrating a protecting heater used for the seat heater according to the first exemplary embodiment.
Figure 2B:
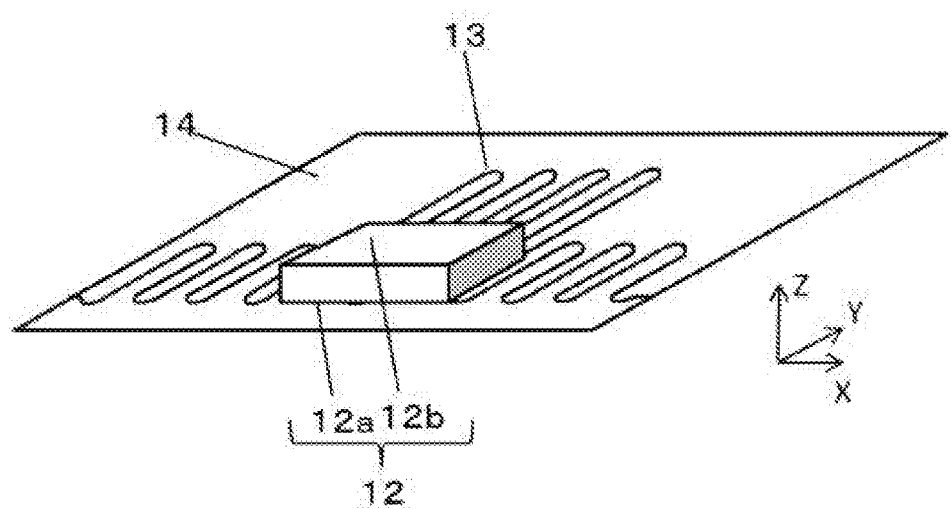
FIG. 2B is an assembly schematic view where a protection device used for the seat heater according to the first exemplary embodiment is disposed on the protecting heater.
Figure 2C:
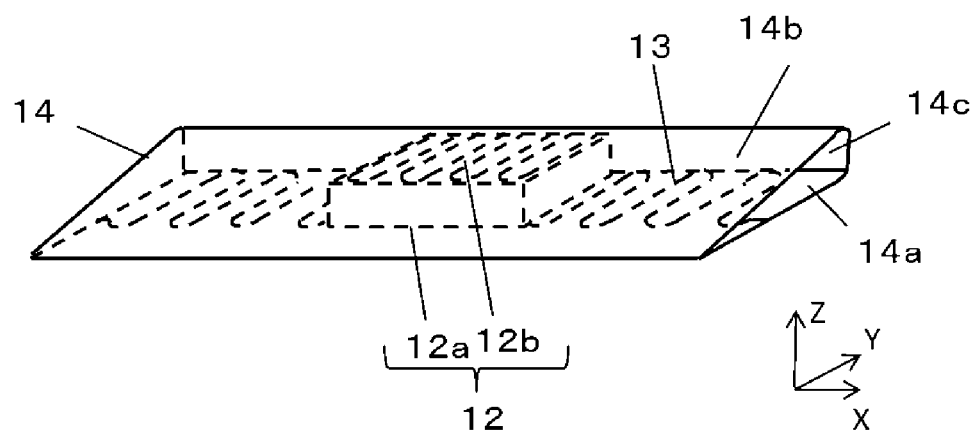
FIG. 2C is an assembly schematic view illustrating the protection device and the protecting heater used for the seat heater according to the first exemplary embodiment.

FIGS. 2A to 2C are assembly schematic views illustrating protection device 12, heater 13, and base material 14 provided in seat heater 10. As shown in FIG. 2A, heater 13 is formed on base material 14. As base material 14, non-woven fabric is used, for example. Heater 13 will be described herein in detail.

As shown in FIG. 2B, protection device 12 is disposed on base material 14. By folding base material 14, as shown in FIG. 2C, heater 13 is disposed so as to interpose protection device 12. In other words, heater 13 covers protection device 12 so as to come into contact with both first surface 12a of protection device 12 and second surface 12b of protection device 12 which are facing each other. In FIGS. 2B and 2C, a bottom surface of protection device 12 is referred to as first surface 12a, and an upper surface of protection device 12 is referred to as second surface 12b. Base material 14 includes first covering portion 14a facing first surface 12a, second covering portion 14b facing second surface 12b, and bending portion 14c coupled to first covering portion 14a and second covering portion 14b. Hereinafter, first covering portion 14a is referred to as covering portion 14a, while second covering portion 14b is referred to as covering portion 14b.

As shown in FIG. 2C, in three directions of openings of folded base material 14, covering portions 14a, 14b are adhered to each other by a double-sided tape. The three directions in FIG. 2C are a negative direction of X axis, a positive direction of X axis, and a negative direction of Y axis, when an origin is specified at a point excluding edges in covering portions 14a, 14b.

By closing the openings of folded base material 14, base material 14 can prevent protection device 12 from dropping.

In FIGS. 2B and 2C, a shape of protection device 12 is shown as a rectangular parallelepiped shape. However, the shape of protection device 12 is not limited to the rectangular parallelepiped shape. Protection device 12 may be formed in, for example, an elongated shape, a cylindrical shape, or a button shape. When protection device 12 is formed in a cylindrical shape, a pair of circular surfaces facing each other configure a first surface and a second surface, respectively.

An arrangement of a heater wire of heater 13 on base material 14, shown in FIGS. 2A to 2C will be described herein.

FIG. 3 is a view illustrating base material 14 shown in FIG. 2A when viewed in a positive direction of Z axis.

FIG. 3 shows an arrangement of the heater wire of heater 13 on base material 14. Protection device 12 is disposed at a position shown with a dotted line. FIG. 3 also shows, with dashed lines, bending portion 14c formed when base material 14 is folded as shown in FIG. 2C.

Heater 13 includes first heating portions 13a, 13b formed meandered only on portion 14a, and second heating portion 13c disposed between first heating portions 13a, 13b, and formed meandered on both portion 14a and portion 14b. Hereinafter, first heating portions 13a, 13b are referred to as heating portions 13a, 13b, and second heating portion 13c is referred to as heating portion 13c.

As shown in FIG. 3, in heater 13, as an example, size B of heating portions 13a, 13b in a direction of Y axis is identical to a length of first surface 12a of protection device 12 in the direction of Y axis. Further, size A of heating portion 13c in the direction of Y axis is approximately identical to a size that is a sum of a length of first surface 12a in the direction of Y axis, a length of second surface 12b in the direction of Y axis, and a thickness of protection device 12. In heating portions 13a, 13b, 13c, a single heater wire is disposed meandered. Therefore, heating portion 13c is electrically connected in series to heating portions 13a, 13b.

At a position of an approximately center of size A, heating portion 13c is folded together with base material 14. In that state, the heater wire configuring heating portion 13c is sewed onto base material 14 so that the heater wire neither comes into contact with each other, nor protrudes from first surface 12a and second surface 12b of protection device 12, which have the largest area and sense a temperature. With such sewing, a possibility of a fuming and/or ignition event due to a mutual contact of a heater wire can be eliminated.

First surface 12a and second surface 12b of protection device 12 are covered by heating portion 13c disposed on covering portions 14a, 14b, and are thus effectively heated. Simultaneously protection device 12 is heated by heating portions 13a, 13b, and thus a temperature of protection device 12 is effectively raised. Further, only heating portion 13c is disposed on both portion 14a and portion 14b. And, heating portions 13a, 13b are disposed only on first covering portion 14a. Accordingly, even though base material 14 is folded, the heater wire configuring heating portions 13a, 13b does not come into contact with each other, and thus base material 14 is less likely to be heated up to a temperature that is hazardous to an occupant.

A temperature activating protection device 12 is higher than an upper limit temperature in a vehicle interior in which seat heater 10 is normally used, but lower than a melting temperature or an ignition temperature of peripheral members of heater 11. The temperature activating protection device 12 means a temperature at which protection device 12 disconnects an electrical connection between power supply 15 and heater 11. Since a temperature in a vehicle interior would sometimes reach 70° C. or higher in a summer season, the temperature activating protection device 12 is set to approximately 80° C., for example. With protection device 12 operating at such a temperature, safety can be secured.

An operation and an effect of seat heater 10 configured as described above will be described herein.

To operate seat heater 10, the controller causes power supply 15 to supply power to heater 11. Upon a temperature of heater 11 reaches a preset temperature, the controller causes power supply 15 to stop supplying power to heater 11. The preset temperature is, for example, 40° C. After that, upon heater 11 is cooled to a temperature lower than the preset temperature, or a predetermined time passes, the controller again causes power supply 15 to supply power to heater 11. The temperature lower than the preset temperature is 39° C., for example, and the predetermined time is one minute, for example. By repeating supplying and stopping of power to heater 11, a temperature of a surface of the seat is kept to a temperature comfortable for an occupant.

In addition to the controller, seat heater 10 is provided with protection device 12, and heater 13 for heating protection device 12. Even if a failure occurred in the controller causes power supply 15 to continuously supply power to heater 11, heater 13 keeps heating protection device 12. Upon a temperature of protection device 12 reaches a predetermined temperature, power to heater 11 can therefore be stopped. The occupant would therefore be less likely to feel uncomfortable, and safety can be improved.

Since protection device 12 is a non-resettable type, when protection device 12 is once heated to the predetermined temperature, and when protection device 12 once activates, power to heater 11 is kept stopped. Since protection device 12 does not resets, power to heater 11 is securely stopped, and thus heater 11 cannot be used.

In recent years, seat heater 10 has been demanded to apply for vehicles, such as hybrid electric vehicles and electric vehicles, for which heat of an engine has been difficult to use to heat inside a vehicle interior. In such a case, due to increased demand of improved capability of seat heater 10, in particular, an increased amount of heat to be output, increasing a density of a heater wire has been required.

Non-resettable protection device 12 can improve safety even when heater 11 outputs more heat. Therefore, with secured safety of seat heater 10, an output of seat heater 10 can be increased by increasing a density of a heater wire. That is, an increased amount of heat and improved safety can be achieved simultaneously.

Heater 13 includes heating portion 13a, heating portion 13b, and heating portion 13c disposed between heating portion 13a and heating portion 13b. Heating portion 13c is disposed so as to interpose protection device 12. In other words, since heating portion 13c is disposed to cover first surface 12a and second surface 12b of protection device 12, and since heating portions 13a, 13b also heat protection device 12 from periphery, protection device 12 can effectively be heated.

Therefore, heater 13 can heat protection device 12 to a temperature more than upper limit temperature Trmax in the vehicle interior, at or under which seat heater 10 operates normally. The temperature activating protection device 12 can also be set to a temperature more than upper limit temperature Trmax. By setting such a temperature, it can be prevented that protection device 12 activates to stop power to heater 11 while a temperature in the vehicle interior is equal to or below upper limit temperature Trmax.

In seat heater 10, protection device 12 is connected between connecting point P and power supply 15. Therefore, power to whole heater 11 can be stopped in an event of abnormality, and thus safety of seat heater 10 can be improved.

To increase an amount of heat to be output from heater 11, resistance values of heaters 11a, 11b are lowered in some cases. A possible measure to lower the resistance values is to increase a thickness of a heater wire of heaters 11a, 11b. By contrast, in seat heater 10, heater 11a, and heater 11b are electrically connected in parallel. A current flowing into heaters 11a, 11b can therefore be reduced. Without increasing a thickness of a heater wire, an output of seat heater 10 can therefore be increased. In addition, it is possible to prevent a cost increase of a heater wire and its prominence to the seat surfaces. A commercial value of seat heater 10 can therefore be increased.

Seat heater 10 provided with single non-resettable protection device 12 has been described. However, a resettable protection device having an activating temperature that is lower than a temperature activating protection device 12 may be added. As a possible resettable protection device, a thermostat, for example, is used.

According to such a configuration, even if a failure has occurred in the controller, the resettable protection device first operates to prevent heater 11 from being heated excessively. Further, even if a failure has occurred in the resettable protection device, or when protection device 12 is heated up to its activating temperature, non-resettable protection device 12 operates to stop power to seating heater 11. Thus, safety can be further improved. Since the activating temperature of the resettable protection device is set lower than the activating temperature of protection device 12, a temperature felt by an occupant before and after an activation of the resettable protection device can be lowered. Therefore, comfort in a vehicle interior can be further improved.

Protection device 12 and heater 13 may be disposed at positions to which an occupant does not come into contact. A temperature of a portion of base material 14, at which protection device 12 is disposed, is higher than a temperature of other portions of base material 14. By disposing protection device 12 at a position to which the occupant does not come into contact, the occupant does not feel heating of heater 13. In addition, since the occupant does not come into contact with protection device 12, the occupant does not feel uncomfortable. The occupant can therefore feel comfortable when seated.

Protection device 12 and heating portion 13c may be mechanically fixed. Thus, a position of protection device 12 would be less likely to move even if load stress is applied, as well as protection device 12 would be less likely to come off and thus protection device 12 would be less likely to not activate. Therefore, abnormality can be stably detected. Protection device 12 can therefore securely activate. To mechanically fix heating portion 13c, any physical fixing method can be used, such as hot melting and fasteners.

Figure 4:
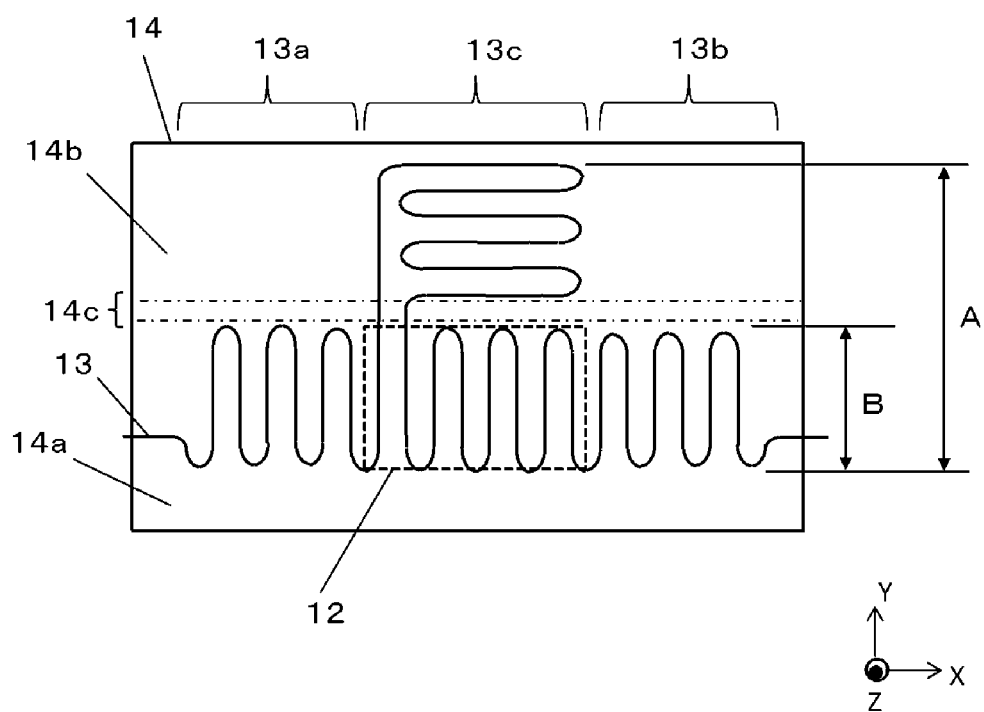
FIG. 4 is a view illustrating an exemplified variation of the arrangement of the protecting heater on the base material shown in FIG. 3.

FIG. 4 is a view illustrating an exemplified variation of the arrangement of the heater wire of heater 13 shown in FIG. 3.

An arrangement of the heater wire of heater 13 is not limited to the example shown in FIG. 3, but may be the arrangement shown in FIG. 4. In the arrangement shown in FIG. 3, when base material 14 is folded as shown in FIG. 2C, the heater wire of heating portion 13c is bent at eight portions. Due to a restoring force of the bented heater wire, a gap between base material 14 and protection device 12 might be created. Such a gap could lower heating efficiency of protection device 12.

By disposing heating portion 13c as shown in FIG. 4, even when base material 14 is folded as shown in FIG. 2C, the heater wire of heating portion 13c is bent at two portions. In other words, when base material 14 is folded, at bending portion 14c on which the heater wire on portion 14a and the heater wire on portion 14b are joined, the heater wire is bent at two portions. Therefore, a restoring force generated at heating portion 13c reduces, heating portion 13c further comes into close contact with protection device 12, and thus protection device 12 can effectively be heated.

Figure 5:
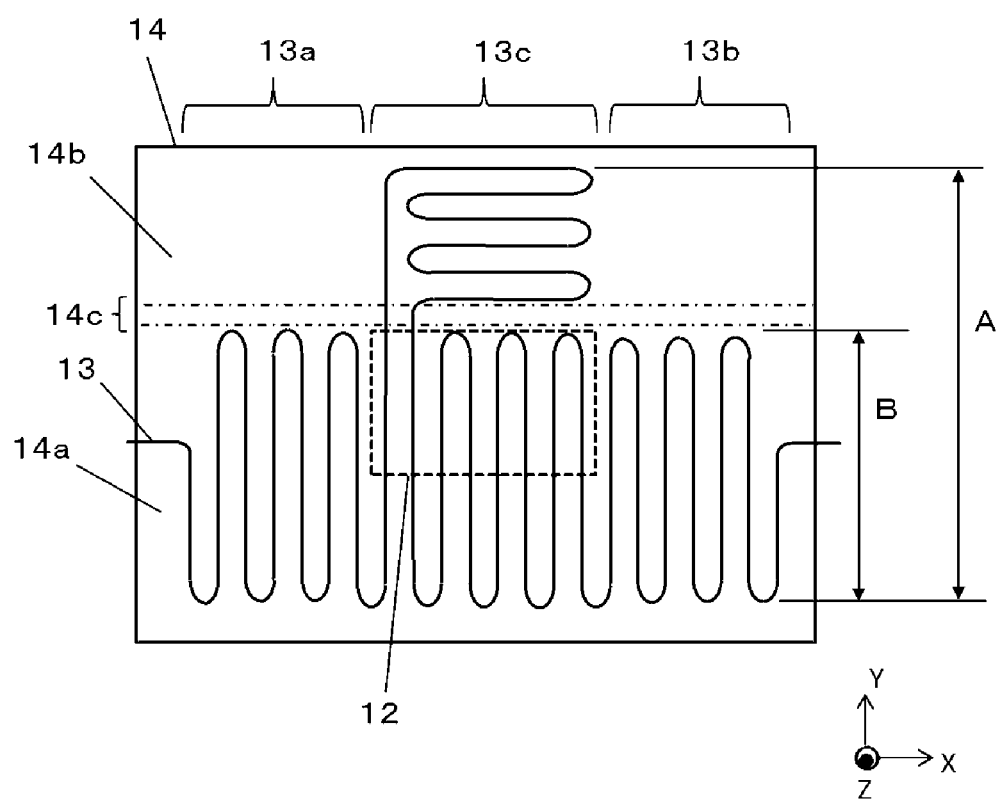
FIG. 5 is a view illustrating another exemplified variation of the arrangement of the protecting heater on the base material shown in FIG. 4.

FIG. 5 is a view illustrating another exemplified variation of the arrangement of the heater wire of heater 13 shown in FIG. 4.

To further heat protection device 12, the heater wire shown in FIG. 4 may be disposed as shown in FIG. 5, for example. By extending and disposing the heater wire on one side, as shown in FIG. 5, protection device 12 can further be heated by not only heating portions 13a, 13b at both ends in a direction of X axis, but also peripheral areas. In FIG. 5, on covering portion 14a, the heater wire of heating portions 13a to 13c is disposed extended in a negative direction of Y axis. Thus, protection device 12 can more effectively be heated. As shown in FIG. 5, by expanding the heater wire in the covering portion at which heating portions 13a, 13b are disposed, even when base material 14 is folded, the heater wire does not come into contact each other.

Second Exemplary Embodiment

Seat heater 20 according to a second exemplary embodiment will be described herein with reference to FIGS. 6 to 9.

Figure 6:
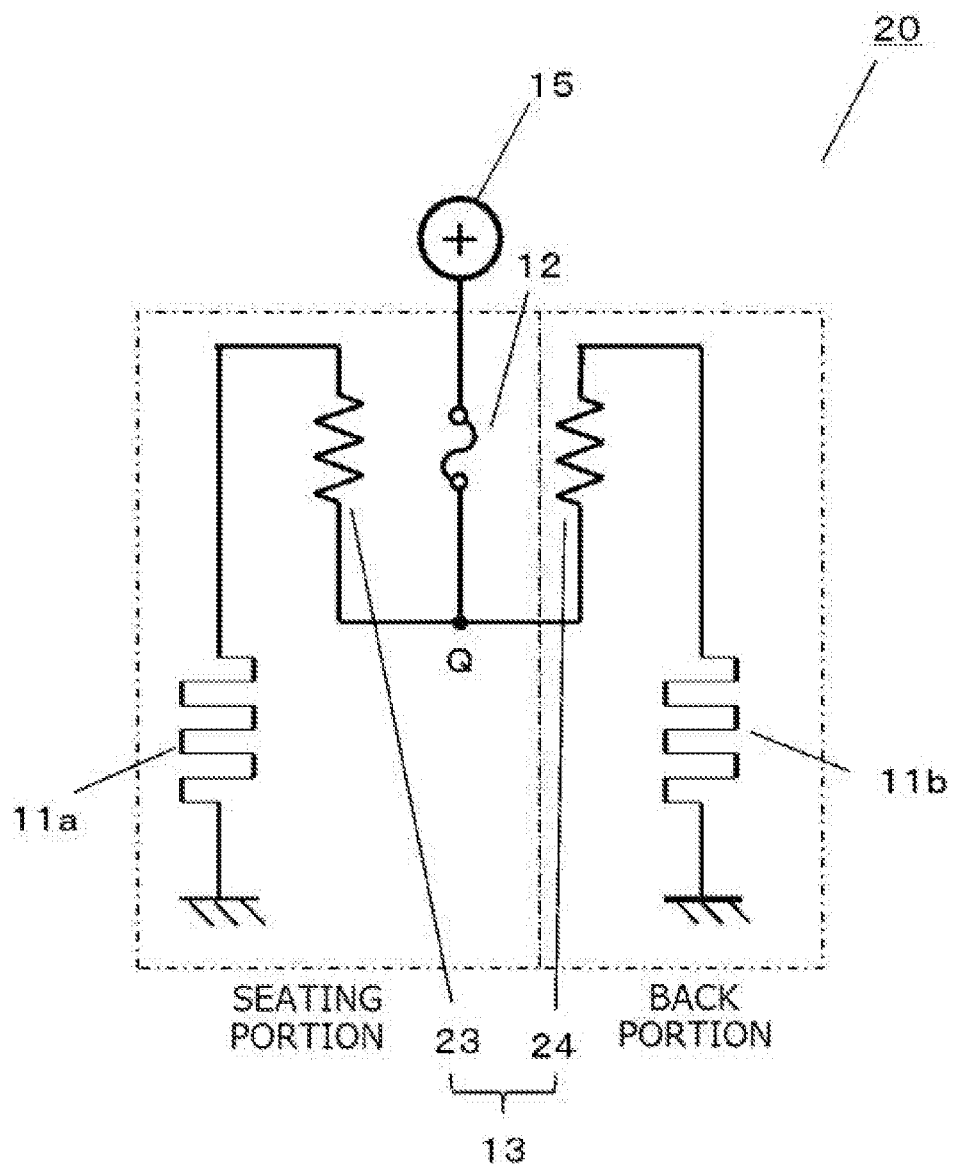
FIG. 6 is a circuit diagram illustrating a seat heater according to a second exemplary embodiment.

FIG. 6 is a circuit diagram illustrating seat heater 20.

Seat heater 20 includes, as protecting heaters for heating protection device 12, first protecting heater 23, and second protecting heater 24. Hereinafter, first protecting heater 23 is referred to as heater 23, and second protecting heater 24 is referred to as heater 24. Heater 23 is connected in series to seating portion heater 11a. Heater 24 is connected in series to back portion heater 11b. Hereinafter, seating portion heater 11a is referred to as heater 11a, and back portion heater 11b is referred to as heater 11b. For protection device 12 and base material 14, since, similar to heaters 11a, 11b, protection device 12 and base material 14 used in seat heater 10 can be used in seat heater 20, identical numbers are applied.

As shown in FIG. 6, a series circuit in which heater 11a and heater 23 are electrically connected and a series circuit in which heater 11b and heater 24 are electrically connected are connected in parallel at connecting point Q.

According to such a configuration, protection device 12 is heated by both of heater 23 and heater 24. Even if a disconnection has occurred in either of heaters 11a, 11b, protection device 12 can be heated with one of the protecting heaters connected to the other heater that is not yet disconnected to activate protection device 12. That is, even if both a disconnection has occurred in either of heaters 11a, 11b, and a failure has occurred in the controller, safety can be secured.

Figure 7:
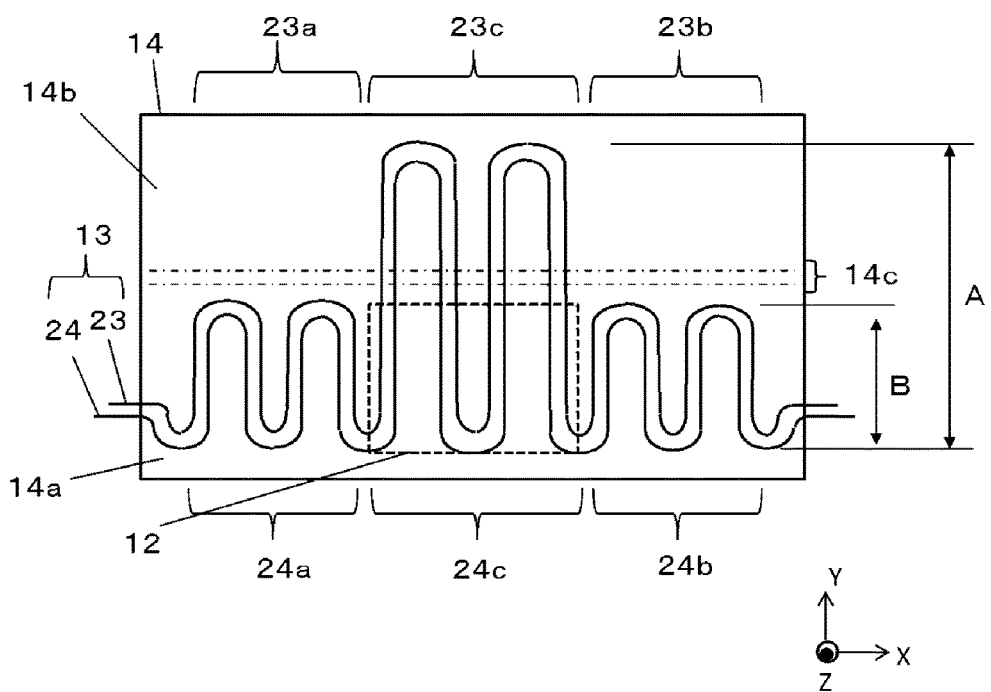
FIG. 7 is a view illustrating an arrangement of a protecting heater on the base material according to the second exemplary embodiment.

FIG. 7 shows an arrangement of heaters 23, 24 on base material 14. Heaters 23, 24 are disposed on base material 14 so that heater wires do not come into contact with each other. Protection device 12 is disposed at a position shown with a dotted line.

Heater 23 includes a pair of first heating portions 23a, 23b formed meandered only on portion 14a, and second heating portion 23c disposed between first heating portion 23a and first heating portion 23b, and formed meandered on both portion 14a and portion 14b. Hereinafter, first heating portions 23a, 23b are referred to as heating portions 23a, 23b, and second heating portion 23c is referred to as heating portion 23c.

Heater 24 is disposed meandered by having at an approximately constant gap from heater 23. Heater 24 includes a pair of first heating portions 24a, 24b formed meandered only on portion 14a, and second heating portion 24c disposed between first heating portion 24a and first heating portion 24b, and formed meandered on both portion 14a and portion 14b. Hereinafter, first heating portions 24a, 24b are referred to as heating portions 24a, 24b, and second heating portion 24c is referred to as heating portion 24c.

Heating portions 23a to 23c are formed by a single heater wire disposed meandered, and are electrically connected in series. Heating portions 24a to 24c are also formed by a single heater wire disposed meandered, and are electrically connected in series.

As shown in FIG. 7, size B of heating portions 23a, 23b, 24a, 24b in a direction of Y axis is narrower than size A of heating portions 23c, 24c in the direction of Y axis, and is approximately identical to a size of protection device 12 in the direction of Y axis. With this dimensional relationship, even though base material 14 is folded, the heater wires of heating portions 23a, 23b, 24a, 24b do not come into contact with each other. An occupant is therefore prevented from being heated to a hazardous temperature.

Heating portions 23c, 24c are sewed onto base material 14 so that, in a state where base material 14 is folded as shown in FIG. 2C, heating portions 23c, 24c do not protrude from first surface 12a and second surface 12b of protection device 12. Therefore, in the example shown in FIG. 7, size A is extended to a length approximately identical to a length obtained by adding a height of protection device 12 to a length that is twice a depth of protection device 12. A depth used herein means a size in a direction of Y axis shown in FIG. 7, and a height means a size in a direction of Z axis. With such sewing, a possibility of a fuming and/or ignition event due to a mutual contact of a heater wire can be eliminated.

Heating portions 23c, 24c are disposed so that protection device 12 is interposed, as well as first surface 12a and second surface 12b are covered. Since heating portions 23a, 23b, 24a, 24b also heat protection device 12 from both ends in a direction of X axis, protection device 12 can further effectively be heated. Therefore, protection device 12 can be easily heated to a temperature more than an upper limit temperature in a vehicle interior, at or under which seat heater 20 operates normally.

A temperature activating protection device 12 can also be set to a temperature more than the temperature in the vehicle interior, at or under which seat heater 20 operates normally. According to such a setting, it can be prevented that protection device 12 activates to stop power to heaters 11a, 11b while seat heater 20 is operating normally, and a temperature in the vehicle interior falls within a normally used temperature range.

In seat heater 20, an amount of heat to be generated (output) by heater 24 is set higher than an amount of heat to be generated (output) by heater 23. Even if a disconnection has occurred in heater 11a, and heater 23 does not heat, protection device 12 can be heated by heater 24 capable of generating a higher amount of heat. According to such a configuration, protection device 12 can be adequately heated. A negative effect of a disconnection in heater 11a that would likely to disconnect due to load stress, compared with heater 11b, can be kept in minimum. Thus, safety can be further improved.

Figure 8:
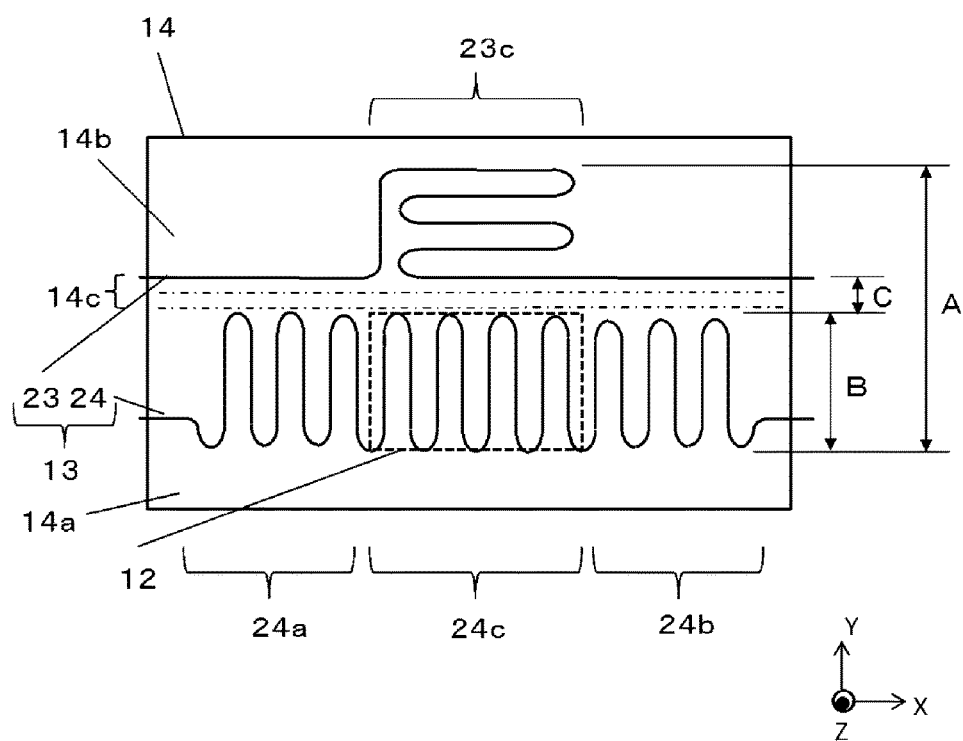
FIG. 8 is a view illustrating an exemplified variation of the arrangement of the protecting heater on the base material shown in FIG. 7.
Figure 9:
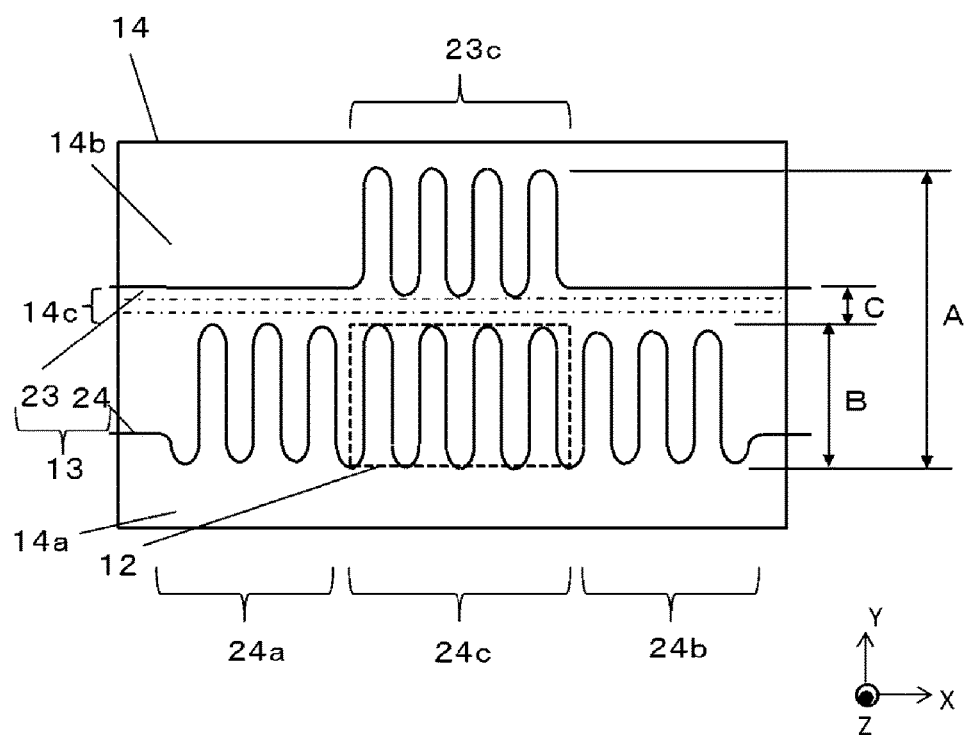
FIG. 9 is a view illustrating another exemplified variation of the arrangement of the protecting heater on the base material shown in FIG. 7.

FIGS. 8 and 9 are exemplified variations of the arrangement of heaters 23, 24 shown in FIG. 7.

An arrangement of heater 13 is not limited to the example shown in FIG. 7, but may be the arrangements shown in FIGS. 8 and 9. In FIGS. 8 and 9, heater 23 is disposed meandered on portion 14b to form heating portion 23c. Heating portion 23c is formed only on portion 14b. Heating portion 23c heats second surface 12b of protection device 12 (see FIG. 2C). Heater 24 is disposed meandered on portion 14a to form heating portion 24c, as well as form heating portions 24a, 24b at both ends of heating portion 24c in a direction of X axis. Heating portion 24c heats first surface 12a of protection device 12 (see FIG. 2C). In FIGS. 8 and 9, heating portion 23c and heating portion 24c together configure a second heating portion of a protecting heater. Size B of heating portions 24a, 24b formed only on portion 14a is shorter than size A of a region where heating portion 23c and heating portion 24c are combined. Heaters 23, 24 are disposed separated by only size C. Size C may be slightly longer than a height of protection device 12. A height used herein means a size in a direction of Z axis in FIGS. 8 and 9.

In the arrangement shown in FIG. 7, when base material 14 is folded as shown in FIG. 2C, the heater wires of heating portions 23c, 24c are bent at eight portions. Due to restoring forces of the bented heater wires, a gap between base material 14 and protection device 12 might be created, which could lower heating efficiency. With the arrangements of the heater wires as shown in FIGS. 8 and 9, the heater wires of heating portions 23c, 24c are not bent even when base material 14 is folded as shown in FIG. 2C. Therefore, neither restoring forces of the heater wires nor a gap will be created. The heater wires of heating portions 23c, 24c and protection device 12 further come into close contact with each other, and thus protection device 12 can effectively be heated.

Third Exemplary Embodiment

Seat heater 40 according to a third exemplary embodiment of the present disclosure will be described herein with reference to FIG. 10.

Figure 10:
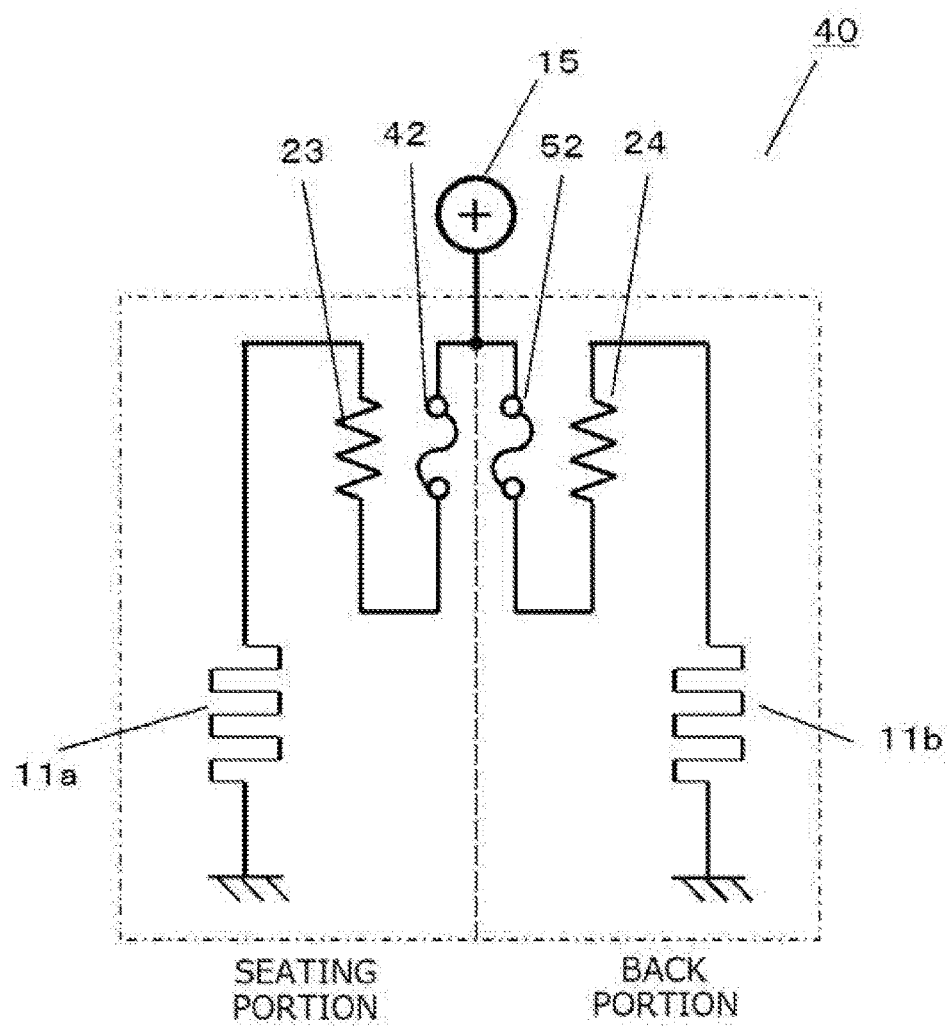
FIG. 10 is a circuit diagram illustrating a seat heater according to a third exemplary embodiment.

FIG. 10 is a circuit diagram illustrating seat heater 40.

As shown in FIG. 10, seat heater 40 includes, as protection device 12, first protection device 42, and second protection device 52. Hereinafter, first protection device 42 is referred to as protection device 42, and second protection device 52 is referred to as protection device 52. It is provided that protection device 42 electrically connected in series to seating portion heater 11a and first protecting heater 23, and protection device 52 electrically connected in series to back portion heater 11b and second protecting heater 24. Hereinafter, seating portion heater 11a is referred to as heater 11a, back portion heater 11b is referred to as heater 11b, first protecting heater 23 is referred to as heater 23, and second protecting heater 24 is referred to as heater 24. In seat heater 40, heater 11a and heater 11b are electrically connected in parallel, heater 11a, protection device 42, and heater 23 are connected in series, and back portion heater 11b, protection device 52, and heater 24 are connected in series.

Heaters 23, 24 are disposed meandered, similar to seat heater 10 shown in FIG. 3 or 4, on base material 14, so that size B of a first heating portion is narrower than size A of the second heating portion. As shown in FIG. 2C, by folding base material 14, respective portions of the second heating portion are configured to cover a portion facing each other of protection device 42, and a portion facing each other of protection device 52.

According to such a configuration, by connecting protection devices 42, 52 respectively to circuit including heater 11a and circuit including heater 11b, currents respectively flowing into protection devices 42, 52 can be reduced. Therefore, small-sized protection devices 42, 52 can be achieved. Seat heater 40 can further easily be disposed in a seat, as well as seat heater 40 can be kept hidden under a seat surface. As described above, protection devices 42, 52 can conveniently be used.

In seat heaters 10, 20, 40, the heater wire(s) of the second heating portion does(do) not come into contact with each other when base material 14 is folded. The heater wire(s) is(are) therefore sewed onto base material 14 so that the heater wire(s) does(do) not protrude from the first surface and the second surface opposite to the first surface of protection device 12, areas of which are greatest and sense a temperature.

Sizes A, B in seat heaters 10, 20, 40 are defined as described below, for example. For example, two parallel virtual straight lines α, β are provided in a direction of X axis shown in FIG. 3. Straight lines α, β are positioned so as to be contact with a heating portion whose size is to be measured. A distance between straight line α and straight line β is size A or size B. Straight line α is positioned so as to be contact with first apex 13e of at least one of first bending portions 13d on the meandering heating portion. And straight line β is positioned so as to be contact with second apex 13g of one of second bending portions 13f bent in a direction opposite to a direction of first bending portions 13d on the meandering heating portion. At this time, for example, when a plurality of first bending portions 13d are provided, and a plurality of first apexes 13e all lie on a single straight line, this single straight line is regarded as straight line α. While, if one or some first apex(es) of the plurality of first apexes 13e lies(lie) on a different position or different positions than the above described single straight line, one of the plurality of first apexes 13e, which lies at a most distant position, with respect to second bending portions 13f, comes into contact with straight line α. This method for positioning straight line α can be applied to a method for positioning straight line β that comes into contact with second apex 13g. In FIG. 3, first bending portions 13d, first apexes 13e, second bending portions 13f, and second apexes 13g are shown on heating portion 13b. However, this arrangement is merely an example, and sizes A, B of heating portions 13a, 13c can be defined in a similar manner. In other words, a pair of straight lines parallel to a direction toward which bending portion 14c is formed and extended may be regarded as straight lines α, β.

In seat heaters 10, 20, 40, as an example, heater 11a and heater 11b configure heater 11. However, at least either of heater 11a and heater 11b may configure heater 11.

A seat heater according to a first aspect of the present disclosure is a seat heater used together with a seat. The seat heater according to the present disclosure includes a seating heater, a protection device of a non-resettable type, a base material, and a protecting heater. The seating heater is connected to a power supply in order to heat the seat. The protection device has a first surface and a second surface opposite to the first surface. When a temperature of the protection device rises to a predetermined temperature, the protection device disconnects a connection between the seating heater and the power supply. The protecting heater heats the protection device. The base material includes a first covering portion covering the first surface of the protection device and a second covering portion covering the second surface of the protection device. The base material, which is sheet shape, is folded so that the first covering portion and the second covering portion face each other. The protecting heater includes a pair of first heating portions and a second heating portion. The first heating portions are formed as a meandered shape only on a surface, which faces the second covering portion, of the first covering portion. The second heating portion is disposed between the pair of first heating portions, and formed as a meandered shape both on the surface, which faces the second covering portion, of the first covering portion, and on a surface, which faces the first covering portion, of the second covering portion.

According to the first aspect of the present disclosure, the protection device can effectively be heated because the second heating portion of the protecting heater covers portions facing each other of the protection device, and further the first heating portion heats the protection device from both ends. A temperature activating the protection device can therefore be set higher, for example, to a temperature more than upper limit temperature Trmax in a vehicle interior. Since a protection device of a non-resettable type, which does not reset after operated, can therefore be used for improved safety, an output of the seat heater can be increased.

The first heating portion is formed only on the first covering portion, and only the second heating portion is formed both on the first covering portion and the second covering portion. Therefore, even when the base material is folded so that the first heating portion covers the portions facing each other of the protection device, a temperature rise to a hazardous temperature can be prevented in case that a heater wire of the first heating portion comes into contact with each other and thus the resistance value lowers.

In a seat heater according to a second aspect of the present disclosure, particularly relating the first aspect, the seat includes a seating portion and a back portion. The seating heater includes a seating portion heater used together with the seating portion, a back portion heater used together with the back portion, and a connecting point disposed between the seating heater and the power supply, the connecting point electrically connecting the seating portion heater and the back portion heater. The seating portion heater and the back portion heater are electrically connected in parallel, and the protection device is disposed between the connecting point and the power supply.

Accordingly, the seating portion heater can heat a buttock and thighs of an occupant, and the back portion heater can heat a back of the occupant. The occupant can therefore feel much more comfortable. Since, when the protection device activates, power to the whole seating heater can securely be stopped, safety can be further improved.

In a seat heater according to a third aspect of the present disclosure, particularly relating the second aspect, the protecting heater includes a first protecting heater electrically connected in series to the seating portion heater, and a second protecting heater electrically connected in series to the back portion heater. The protection device is heated by the first protecting heater and the second protecting heater.

Even if a disconnection has occurred in either the seating portion heater or the back portion heater, a heater for heating a protection device, which is connected to the other seating heater and which has not yet disconnected, can heat the protection device. As described above, even if a disconnection has occurred, the protection device can securely function, and thus safety can be further improved.

In a seat heater according to a fourth aspect of the present disclosure, particularly relating the third aspect, an amount of heat to be generated by the second protecting heater is greater than an amount of heat to be generated by the first protecting heater.

Since the seating portion heater for heating the seating portion is often subject to load stress by the occupant, a disconnection would be more likely to occur in the seating portion heater than in the back portion heater for heating the back portion. By taking into account this point of view, an amount of heat to be generated by the second protecting heater connected to the back portion heater is set larger than an amount of heat to be generated by the first protecting heater. According to such a configuration, even if a disconnection has occurred in the seating portion heater, the second protecting heater can be used to heat the protection device at a higher temperature. Therefore, the protection device can promptly and securely function. Safety can be further improved.

In a seat heater according to a fifth aspect of the present disclosure, particularly relating the first aspect, the seat includes a seating portion and a back portion. The seating heater includes a seating portion heater used together with the seating portion, and a back portion heater used together with the back portion. The protecting heater includes a first protecting heater and a second protecting heater. The protection device includes a first protection device and a second protection device. The seating portion heater and the back portion heater are electrically connected in parallel. The seating portion heater, the first protecting heater, and the first protection device are electrically connected in series. The back portion heater, the second protecting heater, and the second protection device are electrically connected in series. The first protection device is heated by the first protecting heater. The second protection device is heated by the second protecting heater.

As described above, by providing the first and second protection devices electrically connected in parallel each other, a current flowing into each of the protection devices can be reduced. With a reduced current, further smaller protection device can be used. The protection device can therefore easily be disposed in the seat, and the protection device can be kept hidden under the seat surface.

The seat heater according to the present disclosure can improve an output and safety simultaneously. The seat heater is therefore applicable to seats mounted in vehicles other than automobiles, as well as applicable to household personal heaters.

Even though the present disclosure is fully described in conjunction with advantageous exemplary embodiments with reference to the accompanied drawings, it is obvious that those skilled in the art can make various modifications and variations. It should be understood that these modifications and variations without departing from the scope of the present disclosure fall within the scope of the present disclosure as described in the accompanied claims.

The seat heater according to the present disclosure improves an output and safety simultaneously. The seat heater is therefore expected to be used as seat heaters attached to seats of automobiles, airplanes, and other vehicles.

What is claimed is:

1. A seat heater to be used together with a seat, the seat heater comprising:
    a seating heater connected to a power supply in order to heat the seat;
    a protection device which has a first surface and a second surface opposite to the first surface, the protection device being configured to disconnect a connection between the seating heater and the power supply when a temperature of the protection device rises to a predetermined temperature;
    a base material, which is sheet shape, having a first covering portion covering the first surface and a second covering portion covering the second surface, the base material being folded so that the first covering portion and the second covering portion face each other; and
    a protecting heater configured to heat the protection device, the protecting heater including:
        a pair of first heating portions formed as a meandered shape only on a surface, which faces the second covering portion, of the first covering portion, and
        a second heating portion disposed between the pair of first heating portions, the second heating portion being formed as a meandered shape both on the surface, which faces the second covering portion, of the first covering portion and on a surface, which faces the first covering portion, of the second covering portion.

2. The seat heater according to claim 1, wherein:
the seat includes a seating portion and a back portion,
the seating heater includes a seating portion heater used together with the seating portion, a back portion heater used together with the back portion, and a connecting point disposed between the seating heater and the power supply, the connecting point electrically connecting the seating portion heater and the back portion heater, and
the seating portion heater and the back portion heater are electrically connected in parallel, and the protection device is disposed between the connecting point and the power supply.

3. The seat heater according to claim 2, wherein:
the protecting heater includes a first protecting heater electrically connected in series to the seating portion heater, and a second protecting heater electrically connected in series to the back portion heater, and
the protection device is heated by the first protecting heater and the second protecting heater.

4. The seat heater according to claim 3, wherein an amount of heat to be generated by the second protecting heater is greater than an amount of heat to be generated by the first protecting heater.

5. The seat heater according to claim 1, wherein:
the seat includes a seating portion and a back portion,
the seating heater includes a seating portion heater used together with the seating portion and a back portion heater used together with the back portion,
the protecting heater includes a first protecting heater and a second protecting heater,
the protection device includes a first protection device and a second protection device,
the seating portion heater and the back portion heater are electrically connected in parallel,
the seating portion heater, the first protecting heater, and the first protection device are electrically connected in series,
the back portion heater, the second protecting heater, and the second protection device are electrically connected in series,
the first protection device is heated by the first protecting heater, and
the second protection device is heated by the second protecting heater.

6. The seat heater according to claim 1, wherein the protection device is not automatically resettable.

7. The seat heater according to claim 1, wherein the protection device is a thermal fuse.

8. The seat heater according to claim 1, wherein the protection device is manually resettable.

9. The seat heater according to claim 1, wherein the protection device is resettable upon lowering of the temperature of the protection device.

10. The seat heater according to claim 1, wherein the protection device does not automatically reconnect the connection between the seating heater and the power supply.

11. The seat heater according to claim 1, wherein the protection device is one of a thermal fuse, a manually resettable thermostat, or a thermostat that does not automatically reset in a normal environment.

* * * * *